United States Patent [19]
Goel

[11] Patent Number: 4,737,565

[45] Date of Patent: Apr. 12, 1988

[54] SINGLE COMPONENT, LATENT CURING EPOXY RESIN COMPOSITION

[75] Inventor: Anil B. Goel, Worthington, Ohio

[73] Assignee: Ashland Oil, Inc., Ashland, Ky.

[21] Appl. No.: 36,236

[22] Filed: Apr. 9, 1987

[51] Int. Cl.[4] .................... C08G 59/56; C08G 59/62
[52] U.S. Cl. ....................... 528/73; 525/504; 528/69; 528/93; 528/104; 528/64
[58] Field of Search ............... 528/69, 73, 93, 104, 528/64; 525/504

[56] References Cited

U.S. PATENT DOCUMENTS

| | | | |
|---|---|---|---|
| 3,519,576 | 7/1970 | Johnson | 528/104 X |
| 4,250,293 | 2/1981 | Beitchman et al. | 528/93 |
| 4,614,786 | 9/1986 | Goel et al. | 528/73 X |

*Primary Examiner*—Earl Nielsen
*Attorney, Agent, or Firm*—John F. Jones

[57] ABSTRACT

A composition comprising a mixture of a polyepoxide, an isocyanate and a salt of a polyamine and a polyhydric phenol and a process for curing said composition by heating it to a temperature in the range of from about 80° C. to about 150° C. are described.

20 Claims, No Drawings

SINGLE COMPONENT, LATENT CURING EPOXY RESIN COMPOSITION

This invention relates to a single component curing epoxy resin composition having excellent storage time or pot life which is composed of a polyepoxide, an isocyanate compound and a heat activatable curing agent composed of a crystalline salt of a polyamine and a polyhydric phenol.

Single component or one part latent curing epoxy compositions based on curing agents such as boron trifluoride amine complexes, dicyandiamide, melamine, etc. are known in the prior art. These prior art compositions generally have problems of shelf life stability or require high heat curing conditions and long periods of time for the curing to take place.

U.S. Pat. No. 3,519,576 describes the use of polyphenate salts of a polyamine and a polyhydric phenol as latent curing agents for epoxy resins. However, as can be seen from the disclosure of this patent, the salts which provide rapid curing of epoxy resins at moderately elevated temperatures lack good shelf stability under ambient conditions of storage and in order to obtain the shelf stability of greater than three months for a one component epoxy composition of a complex flavan derivative, amine salt is used. The use of isocyanates in the mixture of the polyepoxide resins with polyphenate salts of commonly available polyamines and polyphenols to provide the one part, latent curing epoxy compositions having long shelf stability (greater than three months at ambient temperature) with a rapid curing at moderately elevated temperatures has never been disclosed in the prior art.

Many curing agents including polyamines, amido amines, phenolics, thiols, polycarboxylic acids and anhydrides are known in the prior art for curing epoxy resins to give thermoset polymers which have been used in applications including coatings, adhesives, reinforced plastics, composites and the like. Mixtures of most commonly used conventional amine curing agents with epoxy resins generally have a short pot life; i.e., they remain free-flowing and uncured for only a short time at room temperature. For instance, the commonly used aliphatic amine curatives provide maximum pot life (open time or application time at ambient temperatures) of only a few hours (generally less than five hours). For this reason, most epoxy compositions are based on two-component systems. Considerable efforts have been devoted to developing single component epoxy resin compositions containing latent curing agents which will have a long pot life at room temperature, thus improving the convenience of handling, storing and avoiding the mixing of the resin compositions, but will cure rapidly upon heating at moderately elevated temperatures. In this respect, certain solid amines having high melting points and substantially low solubility in epoxy resins; for instance, melamine, dicyandiamide and the like, have been utilized in single component curable epoxy compositions. The use of such amines requires much elevated temperatures for longer times for cure that are generally acceptable to those working in the art. Many prior art reports are available dealing with the use of certain accelerators for these amine curatives for epoxy resins. For instance, U.S. Pat. Nos. 3,903,048 and 4,459,393 make such disclosures. Other latent curing agents disclosed in the prior art include boron trifluoride amine complexes (U.S. Pat. No. 2,717,885); however, these complexes provide slow cures and are corrosive, sensitive to moisture, and are not truly latent because of a gradual release of the amine curative from the complex or gradual cure of the epoxy resin by the complex itself upon standing.

U.S. Pat. No. 3,519,576 discloses the use of certain polyphenate salts of polyamines and polyhydric phenols, as latent curing agents. However, the polyphenates which are obtainable from the more commonly available polyphenols and polyamines cure epoxy resins readily at moderately elevated temperatures (from about 80 degrees C. to about 150 degrees C.) but have been shown to have poor pot life (shelf stability at ambient temperatures) and thus are not particularly useful in a single component epoxy system. For instance, the polyphenate salt of ethylene diamine and Bisphenol-A which cures epoxy resins in approximately two minutes at 120 degrees C. has been shown to have room temperature shelf life of only one day.

The present invention provides one component, curable epoxy compositions having shelf life superior to those employing known latent curing resins which can be activated at lower temperatures and which, once activated, will cure to hard, tough solid products more rapidly than latent compositions hitherto available. The one component latent curing epoxy compositions of this invention comprise a polyepoxide mixed with an isocyanate which can be a mono isocyanate or a polyisocyanate and a polyphenate salt of a polyamine and a polyhydric phenol. The improved shelf life of the present epoxy compositions over those disclosed in U.S. Pat. No. 3,519,576 is believed to be due to the reaction of isocyanate with partial primary or secondary amine of the polyphenate thus probably behaving as an encapsulation of the polyphenate salt, in situ, and thus making it less soluble in the epoxy resin medium. The modified curing agents of this invention melt rapidly and/or dissolve in the resin composition upon moderate heating. Furthermore, these curing agents provide more rapid cures compared to that of free polyamines and this is believed to be due to the synergistic effect of phenolic with amines and both phenolics and amines undergo reaction with polyepoxides.

In order to demonstrate the significant improvement in the shelf life of the epoxy compositions of this invention exemplified by the salt of ethylene diamine and Bisphenol-A and a small amount of a diisocyanate a shelf life of over three months at room temperature was observed and the composition still cured at 130 degrees C. within two minutes. Without the isocyanate, the same composition was found to have a shelf life at room temperature of only one day. Another advantage of the compositions embodied in this invention is that the presence of small amounts of isocyanates in them results in improving the thixotropic properties of the total composition thus providing non-sagging properties to the composition which is important when one wishes to apply the composition to vertical or other non-horizontal surfaces without concurrent running or dripping of the composition before it is cured such as in coating or adhesive applications.

Epoxy resins or polyepoxides suitable for use in the practice of this invention include those disclosed in U.S. Pat. Nos. 2,500,600 and 2,324,483 which are incorporated herein by reference. Preferred in this invention are 1,2-epoxy compounds having an epoxide equivalence greater than 1, that is to say, compounds containing more than one group of the formula:

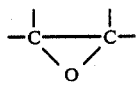

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes or cyclic dienes, such as 1,2,5,6-diepoxy hexane, 1,2,4,5-diepoxy cyclohexane, dicyclopentadiene diepoxide, dipentene diepoxide, vinyl cyclohexene diepoxide, epoxidized diolefinically unsaturated carboxylic acid esters, such as methyl-9,10,12,13-diepoxy stearate or the dimethyl ester of 6,7,10,11-diepoxyhexadecane-1,16-dicarboxylic acid. Furthermore, there may be mentioned epoxidized mono-, di-, or polyester, and mono-, di-, or polyacetals containing at least one cycloaliphatic 5-membered or 6-membered ring, to which at least two 1,2-epoxidized groups are linked.

A widely used class of polyepoxides which can be used in the present invention are the epoxy polyethers obtained by reacting a halogen containing epoxide or dihalohydrin, such as epichlorohydrin, epibromohydrin, 3-chloro-1,2-epoxyoctane, and the like with either a polyhydric phenol or a polyhydric alcohol.

The isocyanates useful in this invention include mono, di and polyisocyanates which can be either aliphatic or aromatic in nature. The amount of isocyanate used in the compositions can vary from about 0.01 to 0.5 isocyanate group per primary and/or secondary amine group present in the polyamine used in the formation of the polyamine-polyphenate salt.

The isocyanates useful in the compositions of this invention include the aromatic and aliphatic monoisocyanates such as phenyl isocyanate, tolyl isocyanate, cyclohexyl isocyanate, tetramethylene xylene isocyanate, linear aliphatic isocyanates and the like.

Polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate, 1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4diisocyanate, xylylene-1,3-diisocyanate, 4,4'-diphenylene methane diisocyanate, 4,4'-diphenylene propane diisocyanate, tetramethylene xylene diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are included in this invention.

Polyphenolic compounds useful in this invention may be any compound having two or more aromatic hydroxyl or phenolic groups per molecule and preferably are those polyphenolic compounds which form crystalline salts with polyamines. Representative polyphenolic compounds include Bisphenol-A, Bisphenol-F, resorcinol, 2,2'- and 4,4-dihydroxy biphenyl, 1,5-dihydroxynaphthalene, p-p'-oxy bisphenol, flavan derivatives, phenol/formaldehyde resins (Novolac), 4,4'-sulfonyldiphenol, tetrachloro Bisphenol-A and others.

The polyamines useful in this invention are those compounds having more than one amino group per molecule and they can contain any combination of primary, secondary and tertiary amine groups. The polyamines may be aliphatic or aromatic in nature and it is further required that at least one of the amine groups be a primary or secondary amine group. Most preferred polyamines are those which when used separately as curatives for epoxy resins are highly reactive, providing rapid cures at room temperature. The salts of polyamines and polyphenolic compounds used in this invention permit the used of reactive polyamines in latent form which only become activated upon heating of the epoxy resin composition for curing of same. Examples of such highly reactive polyamines include ethylene diamine, propylene diamine, 1,6-hexamethylene diamine, mono and di alkyl substituted ethylene or porpylene diamines, diethylene triamine, triethylene tetramine, tetraethylene pentamine, pentaethylene hexamine, dipropylene triamine, cyclohexane diamine, bis-(aminomethyl) cyclohexane, xylylene diamine, piperazine, aminoethyl piperazine, bis(aminopropyl) piperazine, isophorone diamine, dimer acid diamine, dimer acid, triamine, and the like. Other useful polyamines will be apparent to those skilled in the art. The polyphenate salts of polyamines with polyhydric phenols are prepared in about 1:1 molar ratio, however, in some instances the 1:2 salts are also formed. For instance, ethylene diamine forms a 1:1 salt with Bisphenol-A, whereas bis(aminopropyl) piperazine and triethylene tetramine form 1:2 salts with Bisphenol-A.

Fillers, diluents, plasticizers, monoepoxides, and modifiers and other additives of this type commonly know in the art may be incorporated in the compositions of this invention. There is no appreciable deleterious effect on the shelf life of these systems so long as the additives are not solvents for the polyaminophenate salts or the probable reaction product of these salts with isocyanate.

The latent curing polyepoxide compositions of this invention are useful in applications including adhesives, coatings, laminating resins, composites, reinforced structural materials, potting compounds, tooling and molding compounds.

The compositions of this invention may be cured by applying moderate heat, generally above about 80 degrees C. and preferably in the range of from about 100 to 150 degrees C.

This invention is further illustrated in the following representative examples.

EXAMPLE 1

A solution of a liquid diglycidyl ether of Bisphenol-A (epoxy equivalent weight of 185) containing 7.6% by weight of isophorone diisocyanate was prepared and was found to have a shelf stability of over three months at ambient temperatures. A 15 g portion of this material was mixed with 5 g of finely powdered (particle size smaller than 100 mesh) crystalline solid adduct of ethylene diamine with Bisphenol-A prepared by mixing equimolar amounts of a solution of ethylene diamine with a solution of Bisphenol-A in a solvent such as diethyl ether, methanol or toluene followed by separation and drying of the crystalline adduct. The resulting thixotropic paste was divided into two parts, the first part of which was kept at room temperature for a shelf life study and the second part was heated at 130 degrees C. at which temperature curing occurred in one minute and 10 seconds to give a hard solid polymer. This polymer, after post curing at 130 degrees C. for 30 minutes was found to have a Shore D hardness of 84. The first part which was aged at room temperature remained soft and ungelled even after three months. After standing three months, the portion stored at room temperature was heated to 130 degrees C. and gelation occurred within one minute and 15 seconds at this temperature to give a hard polymer which when postcured at 130° C. for 30 minutes was found to have a Shore D hardness of 85. This clearly demonstrates that the mixture of a polyepoxide resin and a solid polyphenate salt of ethylene diamine and Bisphenol-A in the presence of polyisocyanate has long shelf stability at ambient temperatures and is able to cure rapidly at moderately elevated temperatures.

EXAMPLE 2

This example is for comparative purposes demonstrating that in the absence of any isocyanate in the single component epoxide resin composition the material has poor shelf stability. The composition was prepare in accordance with the teachings of U.S. Pat. No. 3,519,576. The procedure of Example 1 was followed using 15 g of the liquid diglycidyl ether of Bisphenol-A and 5 g of the solid ethylene diamine/Bisphenol-A adduct. The first portion which was stored at room temperature was found to have a shelf stability of less than a day giving a semi-solid material and the second portion which was immediately heated at 130 degrees C. was found to cure in one minute and 10 seconds. The solid polymer after post curing at 130° C. for 30 minutes was found to have a Shore D hardness of 85. The shelf stability of this composition at room temperature is in agreement with the disclosure of U.S. Pat. No. 3,519,576 which shows relatively poor shelf stability of the mixture absent the isocyanate which is essential in the compositions of the present invention.

EXAMPLES 3-19

Several polyphenate salts of polyamines with polyphenols were prepared by mixing the solutions of polyamines with the solutions of polyphenols in appropriate stoichiometries. These salts were mixed with the polyepoxide resins either in the presence of small amounts of polyisocyanates or in the absence of any isocyanate materials for comparison purposes. The shelf life stabilities and cure speeds of the compositions at moderately elevated temperatures are listed in Table 1. Example 5, 8, 10, 17 and 19 are for comparative purposes and are otherwise outside the scope of the present invention. It is apparent that the compositions devoid of isocyanates consistently showed poor shelf stability when compared with those those having isocyanates present.

TABLE 1

| Ex. No. | Salt (% by Wt) | Epoxy Resin | Isocyanate (5 by Wt) | Cure Temp (°C.) | Gel Time (Min) | Ambient Shelf Life |
|---|---|---|---|---|---|---|
| 3 | A (20) | E1 | MDI (8.3) | 130 | 1.8 | >1 Month |
| 4 | A (20) | E1 | HMDI (8.3) | 130 | 2.0 | 4 Weeks |
| 5 | B (20) | E1 | None | 120 | 2.0 | 2-3 Weeks |
| 6 | B (25) | E1 | IPDI (7.8) | 120 | 1.8 | >3 Months |
| 7 | B (25) | E1 | MDI (1.3) | 125 | 1.8 | >3 Months |
| 8 | C (20) | E1 | None | 130 | 1.5 | 1 Day |
| 9 | C (20) | E1 | IPDI (7.8) | 130 | 1.6 | >2 Months |
| 10 | D (20) | E1 | None | 126 | 1.6 | 1 Day |
| 11 | D (20) | E1 | IPDI (7.8) | 126 | 1.7 | >2 Months |
| 12 | A (22) | E1 | [IPDI (7.5) Desmocap (10)] | 130 | 1.2 | >2 Months |
| 13 | A (22) | E1 | None | 130 | 1.2 | 1 Day |
| 14 | A (22) | E2 | IPDI (7.8) | 130 | 2.0 | >1 Month |
| 15 | A (22) | E2 | None | 130 | 2.0 | 1 Day |
| 16 | A (24) | E3 | IPDI (8) | 130 | 1.5 | >1 Month |
| 17 | A (24) | E3 | None | 130 | 1.5 | 1 Day |
| 18 | E (20) | E1 | IPDI (7.8) | 120 | 2.0 | >2 Months |
| 19 | E (20) | E1 | None | 120 | 1.9 | 2-3 Weeks |

A = 1:1 salt of ethylene diamine with Bisphenol-A
B = 1:2 salt of triethylene tetramine with Bisphenol-A
C = 1:1 salt of 1,2 diaminopropane with Bisphenol-A
D = 1:1 salt of aminoethylpiperazine with Bisphenol-A
E = 1:1 salt of ethylene diamine with 4,4'-dihydroxybiphenyl
E1 = Liquid diglycidyl ether of Bisphenol-A (epoxy eq. wt. approx. 185)
E2 = 10% diglycidyl ether of poly (propylene oxide) glycol (epoxy eq. wt. 320) added to E1
E3 = 10% N—ethyl toluene sulfonamide added to E1
MDI = Liquid methylene bis(phenyl isocyanate)
HMDI = Hydrogenated MDI
IPDI = Isophorone diisocyanate
Desmocap = Nonyl phenol blocked toluene diisocyanate prepolymer

EXAMPLE 20

A one part structural adhesive composition was prepared by mixing 52.4 parts by weight of the liquid diglycidyl ether of Bisphenol-A treated with 10% carboxylic acid terminated butadiene/acrylonitrile (18% acrylonitrile) Hycar rubber (BF Goodrich), 4 parts by weight of isophorone diisocyanate, 3.1 part by weight of N-ethyl toluene sulfonamide 20.3 parts by weight of dry talc and 20.0 parts by weight of powdered 1:1 adduct of ethylene diamine with Bisphenol-A. This pasty material was applied in the form of a ¼-inch thick bead on a 12 inch long×4 inch wide and 100 mils thick fiberglass reinforced polyester plastic (sheet molding compound), at one end along the length of the SMC. After sprinkling a few 30 mils diameter glass beads to obtain a controlled 30 mils thick adhesive thickness, another SMC sheet of same dimensions as above was placed on top of the adhesive bead, thus covering a one-inch wide area. This was cured in a heated fixture at 230° F. for four minutes under a contact pressure of 1 psi, followed by postcuring at 280° F. for 30 minutes in an oven. One-inch wide lap shear test samples were cut and tested in the following manner:

A=Lap Shear Strength at RT

B=Lap Shear Strength at RT after 400° F./1 hour postbake

C=Lap Shear Strength at 180° F.

The test results are listed in Table 2. Adhesive bonds were also prepared on unprimed cold rolled steel and tested in lap shear mode which showed strength of approx. 1200 psi.

TABLE 2

| Sample No. | Test Procedure | Lap Shear Strength (psi) |
|---|---|---|
| 1 | A | 400 DL |
| 2 | A | 430 DL |
| 3 | B | 421 DL |
| 4 | B | 370 DL |
| 5 | C | 433 DL |
| 6 | C | 448 CF/FT |

DL = Substrate delaminated; CF/FT = Mixed cohesive failure and fiber tear of SMC

I claim:

1. A curable epoxy composition having long shelf life a ambient temperature comprising a mixture of a polyepoxide, an isocyanate and a salt of a polyamine and a polyhydric phenol.

2. The composition of claim 1 wherein the isocyanate is one having at least one isocyanate group per molecule.

3. The composition of claim 2 wherein the polyepoxide is one containing more than one group of the formula:

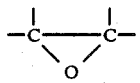

4. The composition of claim 3 wherein the polyhydric phenol is a compound having two or more aromatic hydroxyl groups per molecule.

5. The composition of claim 4 wherein the polyamine is a compound having more than one amine group per molecule at least one of said amine groups being a primary or secondary amine group.

6. The composition of claim 5 wherein the polyhydric phenol is selected from the group consisting of Bisphenol-A, Bisphenol-F, resorcinol, 2,2'-dihydroxy biphenyl, 4,4'-dihydroxy biphenyl, 1,5-dihydroxynaphthalene, p,p'-oxy bisphenol, flavan derivatives, phenol/-formaldehyde resins, 4,4'-sulfonyldiphenol, and tetrachloro Bisphenol-A.

7. The composition of claim 6 wherein the polyamine is selected from the group consisting of ethylene diamine, propylene diamine, 1,6-hexamethylene diamine, monoalkyl substituted monalkyl substituted propylene diamine, dialkyl substituted propylene diamine, diethylene triamine, triethylene tetramine, tetraethylene pentamine, pentaethylene hexamine, dipropylene triamine, cyclohexane diamine, bis(aminomethyl) cyclohexane, xylylene diamine, piperazine, isophorone diamine, dimer acid diamine, and dimer acid triamine.

8. The composition of claim 7 wherein the polyepoxide is the diglycidyl ether of Bisphenol-A.

9. The composition of claim 7 wherein the polyepoxide is the diglycidyl ether of poly(propylene oxide) glycol.

10. The composition of claim 8 wherein the isocyanate is methylene bis(phenyl isocyanate).

11. the composition of claim 8 wherein the isocyanate is hydrogenated methylene bis(phenyl isocyanate).

12. The composition of claim 8 wherein the isocyanate is isophorone diisocyanate.

13. The composition of claim 8 wherein the isocyanate is nonyl phenol blocked toluene diisocyanate prepolymer.

14. The composition of claim 9 wherein the isocyanate is isophorone diisocyanate.

15. The composition of claim 8 wherein the polyamine is ethylene diamine and the polyhydric phenol is Bisphenol-A.

16. The composition of claim 8 wherein the polyamine is triethylene tetramine and the polyhydric phenol is Bisphenol-A.

17. The composition of claim 8 where in the polyamine is 1,2-diaminopropane and the polyhydric phenol is Bisphenol-A.

18. The composition of claim 8 wherein the polyamine is aminoethyl piperazine and the polyhydric phenol is Bisphenol-A.

19. The composition of claim 8 wherein the polyamine is ethylene diamine and the polyhydric phenol is 4,4'-dihydroxybiphenyl.

20. The process comprising curing a composition comprising a mixture of a polyepoxide, an isocyanate and a salt of a polyamine and a polyhydric phenol by heating said composition at a temperature in the range of from about 80° C. to about 150° C.

* * * * *